United States Patent
Kim

(10) Patent No.: US 10,131,309 B2
(45) Date of Patent: Nov. 20, 2018

(54) APPARATUS AND METHOD FOR CONTROLLING AIRBAG

(71) Applicant: Hyundai Motor Company, Seoul (KR)

(72) Inventor: Seon A Kim, Yeongdeungpo-Gu (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/356,986

(22) Filed: Nov. 21, 2016

(65) Prior Publication Data

US 2017/0327069 A1 Nov. 16, 2017

(30) Foreign Application Priority Data

May 16, 2016 (KR) ........................ 10-2016-0059562

(51) Int. Cl.

| | |
|---|---|
| *B60R 21/015* | (2006.01) |
| *B60R 21/0136* | (2006.01) |
| *B60R 21/01* | (2006.01) |
| *G06K 9/00* | (2006.01) |
| *B60R 11/04* | (2006.01) |
| *B60R 21/263* | (2011.01) |
| *G06K 9/46* | (2006.01) |
| *B60R 11/00* | (2006.01) |

(52) U.S. Cl.
CPC ........ *B60R 21/01538* (2014.10); *B60R 11/04* (2013.01); *B60R 21/0136* (2013.01); *B60R 21/01552* (2014.10); *B60R 21/263* (2013.01); *G06K 9/00255* (2013.01); *G06K 9/00268* (2013.01); *G06K 9/00281* (2013.01); *G06K 9/00838* (2013.01); *G06K 9/00845* (2013.01); *G06K 9/4647* (2013.01); *B60R 2011/0003* (2013.01); *B60R 2021/01286* (2013.01)

(58) Field of Classification Search
None
See application file for complete search history.

(56) References Cited

U.S. PATENT DOCUMENTS

| | | | | |
|---|---|---|---|---|
| 4,625,329 | A * | 11/1986 | Ishikawa | ........... B60R 1/07 180/271 |
| 6,493,620 | B2 * | 12/2002 | Zhang | ........... G06K 9/00362 382/175 |
| 6,724,920 | B1 * | 4/2004 | Berenz | ........... G06K 9/00221 180/169 |

(Continued)

FOREIGN PATENT DOCUMENTS

| | | |
|---|---|---|
| JP | 2008-307987 A | 12/2008 |
| JP | 5262570 B2 | 8/2013 |

(Continued)

*Primary Examiner* — Thomas G Black
*Assistant Examiner* — Demetra R Smith-Stewart
(74) *Attorney, Agent, or Firm* — Mintz Levin Cohn Ferris Glovsky and Popeo, P.C.; Peter F. Corless

(57) ABSTRACT

An apparatus and a method for controlling an airbag are provided. The apparatus includes an imaging device that includes cameras and lights and an image processor that performs an image processing for an image obtained by the imaging device. A collision sensor senses a collision of a vehicle and an airbag driver operates the airbag. A controller extracts face information of a passenger from the image of which the image processing is performed by the image processor, determines airbag control information based on the extracted face information, and then operates the airbag driver based on the determined airbag control information when the collision of the vehicle is predicted.

14 Claims, 10 Drawing Sheets

(56) References Cited

U.S. PATENT DOCUMENTS

| | | | |
|---|---|---|---|
| 6,904,347 B1 | 6/2005 | Berenz et al. | |
| 7,134,688 B2* | 11/2006 | Takagi | B60R 21/01556 280/735 |
| 7,142,694 B2* | 11/2006 | Hashimoto | G06K 9/00369 187/247 |
| 7,311,326 B2* | 12/2007 | Matsuda | G01S 17/46 280/735 |
| 7,379,559 B2* | 5/2008 | Wallace | G06K 9/00248 348/113 |
| 7,729,513 B2* | 6/2010 | Ohkubo | B60R 21/0134 382/104 |
| 7,898,402 B2* | 3/2011 | Odate | G06K 9/00362 340/438 |
| 8,897,969 B2* | 11/2014 | Shigemura | B60R 21/0136 701/1 |
| 2005/0077469 A1* | 4/2005 | Kaushal | B60R 21/01516 250/330 |
| 2006/0280336 A1 | 12/2006 | Lee | |
| 2013/0184939 A1 | 7/2013 | Shigemura | |
| 2014/0168441 A1 | 6/2014 | Koike | |
| 2014/0204193 A1* | 7/2014 | Zhang | G06K 9/00597 348/78 |
| 2015/0237246 A1* | 8/2015 | Omi | H04N 5/2353 348/362 |

FOREIGN PATENT DOCUMENTS

| | | |
|---|---|---|
| JP | 5638139 B2 | 12/2014 |
| KR | 10-0440669 | 7/2004 |
| KR | 10-0507187 | 8/2005 |
| KR | 10-0630842 B1 | 9/2006 |
| KR | 10-1440964 | 9/2014 |

* cited by examiner

APPARATUS AND METHOD FOR CONTROLLING AIRBAG

CROSS-REFERENCE TO RELATED APPLICATION

This application is based on and claims the benefit of priority to Korean Patent Application No. 10-2016-0059562, filed on May 16, 2016 in the Korean Intellectual Property Office, the disclosure of which is incorporated herein in its entirety by reference.

TECHNICAL FIELD

The present disclosure relates to an apparatus and a method for controlling an airbag, and more particularly, to an apparatus and a method for controlling an airbag capable of extracting face information of a passenger using an imaging device and adjusting an unfolding angle (direction), an unfolding speed, and an unfolding pressure of the airbag based on the extracted face information.

BACKGROUND

In general, an airbag is a safety apparatus that protects a driver or a passenger from impact during a vehicle collision. Such airbag system is disposed within a steering wheel or a dashboard to unfold in response to a vehicle collision. Conventionally, an airbag system that unfolds or deploys the airbag by measuring weight of the passenger using a sensor mounted within a seat and adjusting an unfolding pressure of the airbag based on the measured weight of the passenger has been developed.

Further, conventionally, a technology that adjusts pressure of the airbag based on a face position of the passenger and a seat position has been developed. Since an airbag control unit (ACU) according to the related art described above unfolds the airbag regardless of whether the passenger wears glasses or other protective wear, a secondary injury to the passenger may occur due to the impact caused when the airbag is deployed.

SUMMARY

The present disclosure provides an apparatus and a method for controlling an airbag capable of extracting face information of a passenger using an imaging device, and adjusting an unfolding angle (direction), an unfolding speed, and an unfolding pressure of the airbag based on the extracted face information.

According to an exemplary embodiment of the present disclosure, an apparatus for controlling an airbag may include: an imaging device including one or more cameras and one or more lights (e.g., lighting devices); an image processor configured to execute an image processing for an image obtained by the imaging device; a collision sensor configured to sense a collision of a vehicle; an airbag driver configured to operate the airbag; and a controller configured to extract face information of a passenger from the image processed by the image processor, determine airbag control information based on the extracted face information, and then operate the airbag driver based on the determined airbag control information when the collision of the vehicle is predicted.

The imaging device may be implemented by a driver state monitoring (DSM) apparatus. When the imaging device includes two or more cameras, the controller may be configured to execute one or more camera calibrations when the imaging device is mounted within the vehicle. The face information may include a face position, whether the passenger wears glasses or other protective wear, and a distance between the camera and a face of the passenger. The airbag control information may include an unfolding angle, an unfolding pressure, and an unfolding speed of the airbag. The term unfolding may also be regarded as a deployment of the airbag.

The image processor may be configured to convert the obtained image into a binarization image and then remove noise using a mask. The image processor may further be configured to perform a binarization processing for the image obtained by the imaging device when the passenger is not present within the vehicle to generate a mask, and store the generated mask in a memory. When a mounting position and angle of the imaging device are changed, the image processor may be configured to obtain an image inside of the vehicle (e.g., photograph the inside of the vehicle) when a passenger is not detected within the vehicle and perform the binarization processing for the photographed image to generate the mask, and update a previous mask stored in the memory. The controller may be configured to determine whether the passenger wears glasses based on whether a lighting reflection point having a reference size or greater is detected within the obtained image.

According to another exemplary embodiment of the present disclosure, a method for controlling an airbag may include: obtaining, by an imaging device, an image; extracting face information of a passenger from the obtained image; determining airbag control information based on the face information; sensing a collision of a vehicle after determining the airbag control information; and unfolding the airbag based on the airbag control information when the collision of the vehicle is sensed.

The method may further include performing a camera calibration before the obtaining of the image, when the imaging device includes two or more cameras. The extracting of the face information may include: confirming a face position within the obtained image; and confirming whether the passenger wears glasses from the obtained image. The confirming of the face position may include: converting the obtained image into a binarization image; removing noise within the binarization image using a designated mask; and confirming the face position by calculating a column accumulation graph and a row accumulation graph for the binarization image from which the noise is removed. In the confirming of whether the passenger wears the glasses, whether the passenger wears the glasses may be confirmed using a lighting reflection point detected within the obtained image. The extracting of the face information may further include calculating a distance between a camera and a face of the passenger after the confirming of the face position.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present disclosure will be described in detail with reference to the accompanying drawings.

Figure 1:
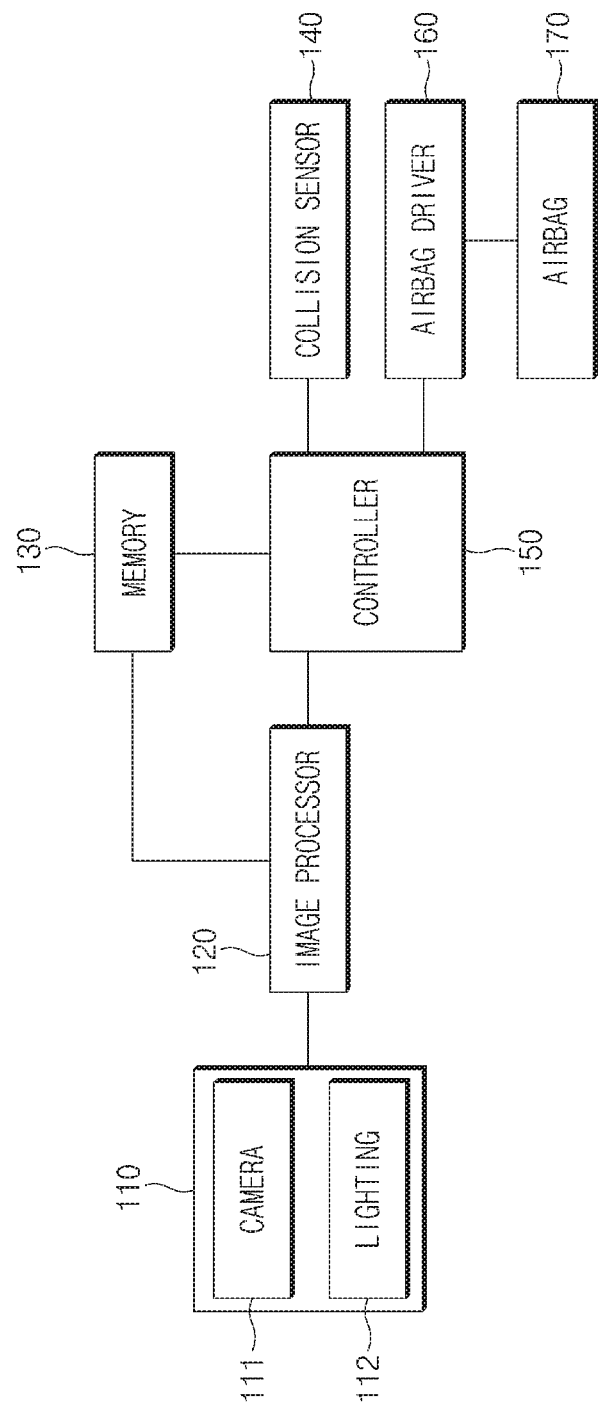
FIG. 1 is block configuration diagram illustrating an apparatus for controlling an airbag according to an exemplary embodiment of the present disclosure.

FIG. 1 is block configuration diagram illustrating an apparatus for controlling an airbag according to an exemplary embodiment of the present disclosure. As illustrated in FIG. 1, an apparatus for controlling an airbag may include an imaging device 110, an image processor 120, a memory 130, a collision sensor 140, a controller 150, and an airbag driver 160. The controller 150 may be configured to operate the other components of the apparatus.

Particularly, the imaging device 110 may be configured to capture an image within a vehicle (e.g., photograph the inside of the vehicle). The imaging device 110 may include a camera 111 and a light 112 (e.g., a lighting device). The camera 111 may be implemented by an infrared camera, and the light 112 may be implemented by an infrared light emitting diode (LED). Although the present exemplary embodiment describes an example in which the imaging device 110 includes one camera 111 and one light 112, the imaging device 110 is not limited thereto. For example, the imaging device 110 may also be configured to include two or more cameras 111 and two or more light 112.

Further, the imaging device 110 may be implemented by a camera and a light included in a driver state monitoring (DSM) system. In other words, when the driver state monitoring (DSM) system is mounted within the vehicle, the apparatus for controlling an airbag may be configured to obtain an image of the passenger (e.g., a driver and a passenger) using the light and the camera of the driver state monitoring (DSM) system, without separately implementing an imaging device 110. The imaging device 110 may be disposed at the front of the respective seats (e.g., a driver seat, a passenger seat, and a back seat) within the vehicle, respectively. For example, the imaging device 110 may be mounted in a steering wheel or an instrument panel, a dashboard, or a headrest of a seat, and the like.

The image processor 120 may be configured to perform an image processing for an image (image data) photographed by the imaging device 110. In other words, when the image is obtained by the imaging device 110, the image processor 120 may be configured to perform binarization for the obtained image. For example, the image processor 120 may be configured to determine whether a value of each pixel (pixel value) of the image is a threshold or greater. As the confirmation result, when the pixel value is the threshold or greater, the image processor 120 may be configured to set the pixel value of the corresponding pixel to '1', and when the pixel value is less than the threshold, the image processor 120 may be configured to set the pixel value of the corresponding pixel to '0'. Further, the image processor 120 may be configured to remove noise (e.g., a window region of a vehicle) from an image (binarization image) binarized using a designated mask. Thereafter, the image processor 120 may be configured to transmit the binarization image from which the noise is removed to the controller 150.

Further, the image processor 120 may be configured to generate a mask for removing the noise and store the mask in the memory 130. After a type of vehicle and a mounting position of the imaging device 110 are determined, when the imaging device 110 is mounted in the determined position within the vehicle, the image processor 120 may be configured to obtain the image using the imaging device 110 when no passenger is detected within the vehicle (e.g., using various pressure sensors or through the image processing).

The image processor 120 may be configured to process a binarization process for the obtained image to generate the mask.

When a position and an angle of the imaging device 110 are changed, the image processor 120 may be configured to determine whether an entrance condition into a mask correction (update) mode is satisfied. In addition, when the position and the angle of the imaging device 110 are adjusted, the image processor 120 may be configured to detect the adjusted position and angle via communication with the imaging device 110. When the entrance condition into the mask correction mode is satisfied, the image processor 120 may be configured to enter the mask correction mode. For example, when the driver turns off the vehicle, or in response to determining, using a weight sensor of the seat, that a seat of the passenger is vacated, the image processor 120 may be configured to enter the mask correction mode.

When the image processor 120 enters the mask correction mode, the image processor 120 may be configured to obtain the image when no passenger is detected within the vehicle, using the imaging device 110. The image processor 120 may be configured to calculate an average image for a predetermined number of images which are stored recently. The image processor 120 may further be configured to calculate an average pixel value for each of corresponding pixels between the recent images (e.g., recently obtained images). The image processor 120 may be configured to convert the average image into the binarization image to generate the mask. In addition, the image processor 120 may be configured to update a previous mask stored in the memory 130 with the generated mask.

Further, the image processor 120 may be configured to extract a face region (e.g., face image) from the image photographed by the imaging device 110, and detect a lighting reflection point from the extracted face region within the image. In particular, the image processor 120 may be configured to extract a specific region (e.g., eye region) from the face region, and perform the binarization for an image (e.g., an eye image) of the extracted specific region to detect the lighting reflection point. Since the face region and/or eye region detection is performed using any one of known face region and/or eye region detection techniques, a detailed description thereof will be omitted in the present exemplary embodiment.

The memory 130 may be configured to store a lookup table in which a program for operating the controller 150, the mask, the image photographed by the imaging device 110, and airbag control information according to face information are recorded. Further, the memory 130 may also be configured to temporarily store data which is input and output according to an operation of the apparatus for operating an airbag. The memory 130 may be implemented as any one of storage media such as a flash memory, a hard disk, a secure digital (SD) card, a random access memory (RAM), a read only memory (ROM), a web storage, and the like.

The collision sensor 140 may be configured to sense a dangerous situation (e.g., a collision) of the vehicle. The collision sensor 140 may be implemented by a plurality of impact sensors configured to sense impact or may be implemented by a collision avoidance system (CAS), or the like. When the collision sensor 140 is implemented by the CAS, the collision sensor 140 may be configured to predict a collision point of time (e.g., time to collision), a collision position, and the like in advance. The controller 150 may be configured to detect a face position using a row accumulation graph and a column accumulation graph of the image of which the image processing is performed by the image processor 120. In other words, the image processor 120 may be configured to calculate the column accumulation graph by adding pixel values of all columns for each of rows, and calculate the row accumulation graph by adding pixel values of all rows for each of columns.

The controller 150 may be configured to determine a value having a highest value (e.g., a highest accumulated pixel value) through distribution of each of the graphs as a central point of the face. In addition, the controller 150 may be configured to designate from a point having a value (accumulated pixel value) of a predetermined value or greater to a point at which the value is decreased to a value of the predetermined value or less in each of the graphs, as the face region. When two or more face regions are detected, the controller 150 may be configured to define a longest region as the face region.

The controller 150 may further be configured to determine whether the passenger wears glasses or other protective eyewear that potentially causes a reflection in image data based on a size of the lighting reflection point detected by the image processor 120. For example, when a light reflection point having a set reference size or greater is detected among the detected lighting reflection points, the controller 150 may be configured to determine that the passenger is wearing the glasses, and when no light reflection point having the reference size or greater is detected, the controller 150 may be configured to determine that the passenger is not wearing glasses. In particular, the reference size may be determined within about 10% of the highest pixel value within the image.

The controller 150 may be configured to detect face information of the passenger from the image output from the image processor 120. Particularly, the face information of the passenger may include a face position of the passenger, whether the passenger wears the glasses, and a distance (hereinafter, a face distance) from the camera 111 to the face. Additionally, the controller 150 may be configured to determine the airbag control information based on the face information of the passenger utilizing the lookup table prestored in the memory 130. In particular, the airbag control information may include an unfolding angle (unfolding or deployment direction), an unfolding pressure, and an unfolding speed of the airbag, and a position of an airbag to be unfolded among a plurality of airbags. The term unfolded as used herein as indicating a deployment of the airbag.

When the collision sensor 140 senses the collision of the vehicle, the controller 150 may be configured to transmit the determined airbag control information to the airbag driver 160. In other words, the controller 150 may be configured to operate the airbag driver 160 to unfold the airbag based on the determined airbag control information. The airbag driver 160 may be configured to adjust the position of the airbag under the control of the controller 150 and then unfold or deploy the airbag at the defined unfolding pressure. In other words, the airbag driver 160 may be configured to unfold the airbag at the unfolding pressure, at the unfolding speed, and in the unfolding direction (unfolding angle) of the airbag determined by the controller 150. The airbags are fixedly mounted within a horn or center region of the steering wheel, and the front and side of each of the seats within the vehicle. Such airbags may be selectively unfolded. To adjust the unfolding direction of the airbag, a motor is connected to a connection portion to allow six-axis movements (x, y, z, an x axis rotation, a y axis rotation, and a z axis rotation).

Figure 2:
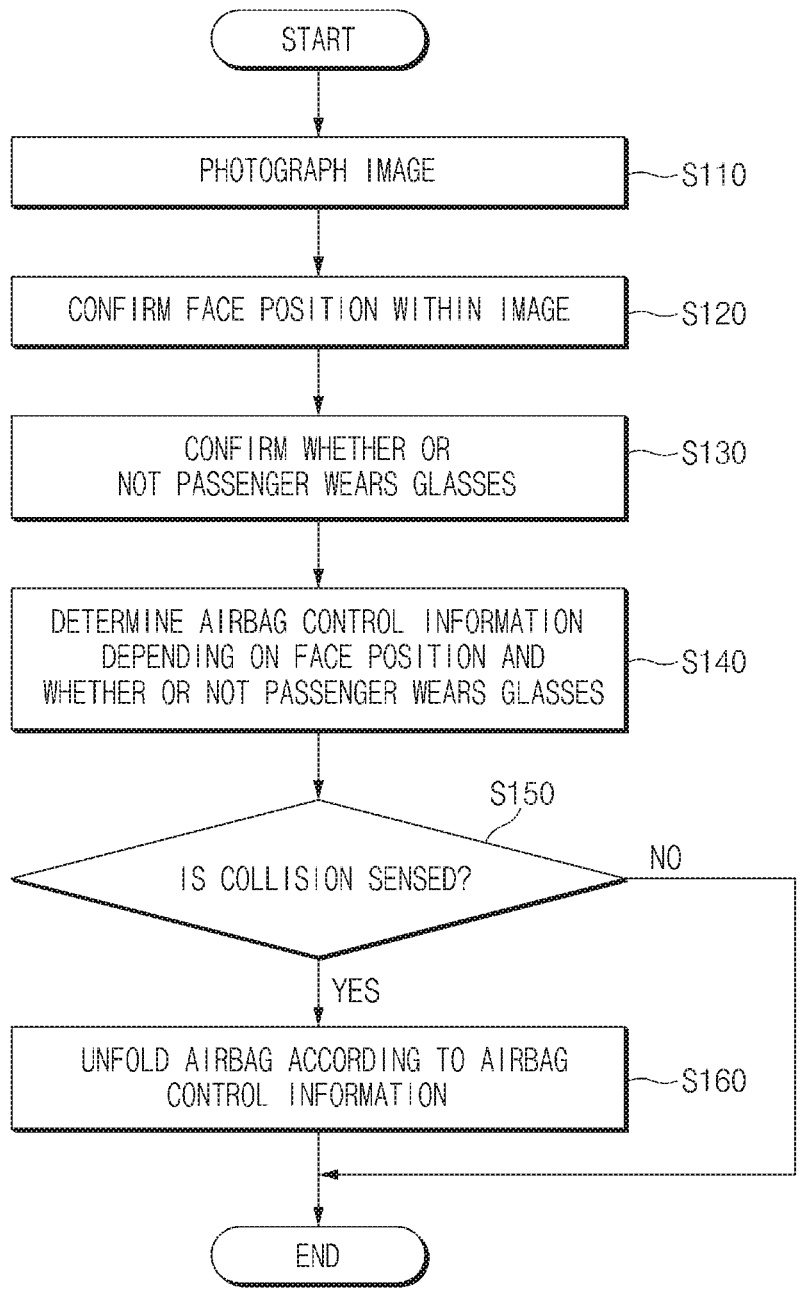
FIG. 2 is a flowchart illustrating a method for controlling an airbag according to an exemplary embodiment of the present disclosure.

FIG. 2 is a flowchart illustrating a method for controlling an airbag according to an exemplary embodiment of the present disclosure. As illustrated in FIG. 2, the controller 150 may be configured to capture the image using the imaging device 110. When the imaging device 110 is mounted in a determined position within the vehicle, the controller 150 may be configured to receive the image photographed by the imaging device 110 from the image processor 120.

The controller 150 may be configured to detect the face position of the passenger from the image obtained by the imaging device 110 (S120). In particular, the image processor 120 may be configured to perform an image processing for the image transmitted from the imaging device 110 and transmit the processed image to the controller 150. The controller 150 may further be configured to detect the face position of the passenger from the image of which the image processing is performed by the image processor 120. The controller 150 may be configured to determine whether the passenger wears glasses from the obtained image (S130). In particular, the controller 150 may be configured to determine whether the passenger wears the glasses using the lighting reflection point (glint) reflected from a glasses lens.

Furthermore, the controller 150 may be configured to determine the airbag control information based on the face position and whether the passenger wears the glasses (S140). In particular, the controller 150 may be configured to determine the airbag control information such as the unfolding angle, the unfolding pressure, and the unfolding speed of the airbag utilizing the lookup table stored in the memory 130. Thereafter, the controller 150 may be configured to detect whether the collision of the vehicle occurs (S150). In other words, the controller 150 may be configured to sense the dangerous situation (e.g., vehicle collision) of the vehicle using the collision sensor 140. When the collision of the vehicle is sensed, the controller 150 may be configured to deploy or unfold the airbag based on the determined airbag control information (S160). The airbag driver 160 may be configured to operate the airbag at the unfolding angle, the unfolding pressure, and the unfolding speed determined under the operation of the controller 150.

Figure 3:
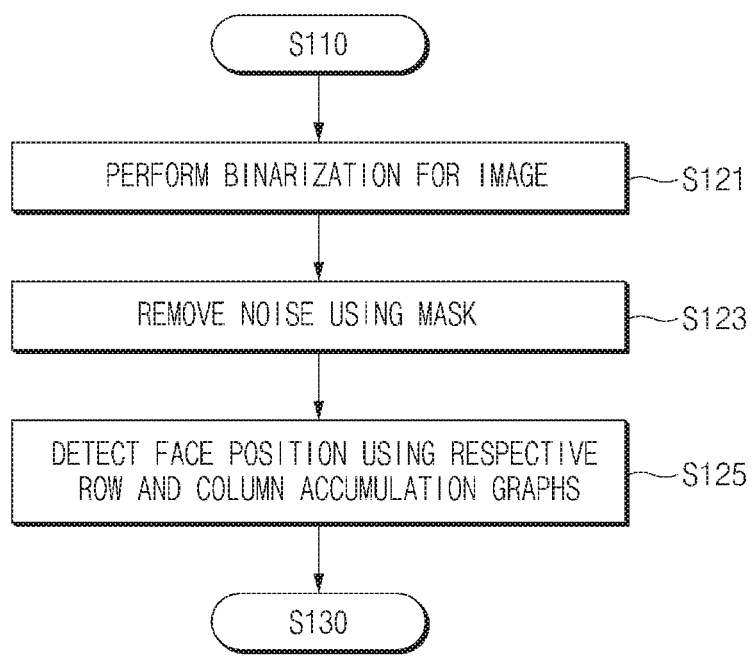
FIG. 3 is a flowchart illustrating a process of confirming a face position illustrated in FIG. 2 according to an exemplary embodiment of the present disclosure.
Figure 4A:
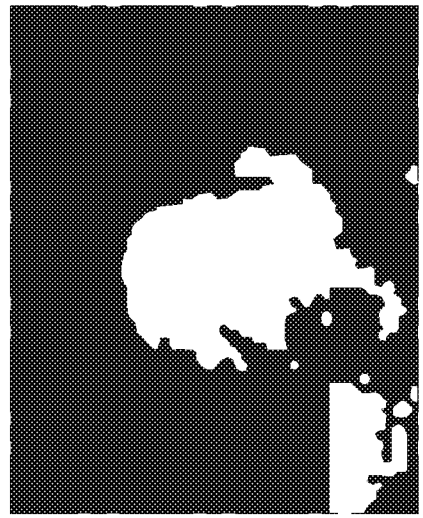
FIGS. 4A to 4C are examples of confirming a face position according to an exemplary embodiment of the present disclosure.
Figure 4A:
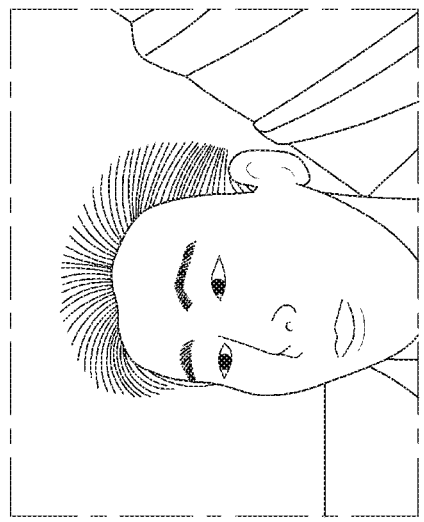

FIG. 3 is a flowchart illustrating a process of confirming a face position illustrated in FIG. 2 and FIGS. 4A to 4C are examples of confirming a face position. The image processor 120 may be configured to convert the image obtained from the imaging device 110 into the binarization image using the binarization processing under the operation of the controller 150 (S121). For example, as illustrated in FIG. 4A, the image processor 120 may be configured to perform the binarization for the obtained image using the threshold discussed previously related to a pixel value.

Figure 4B:
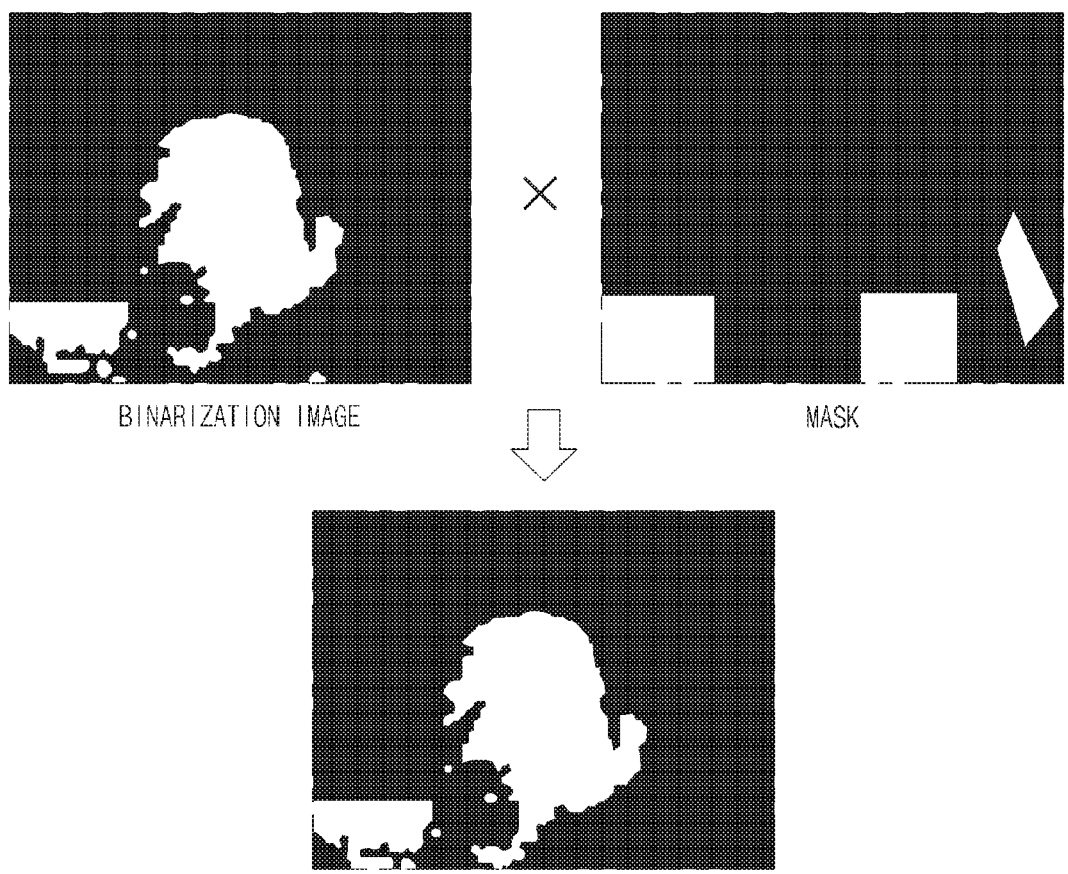
Figure 4C:
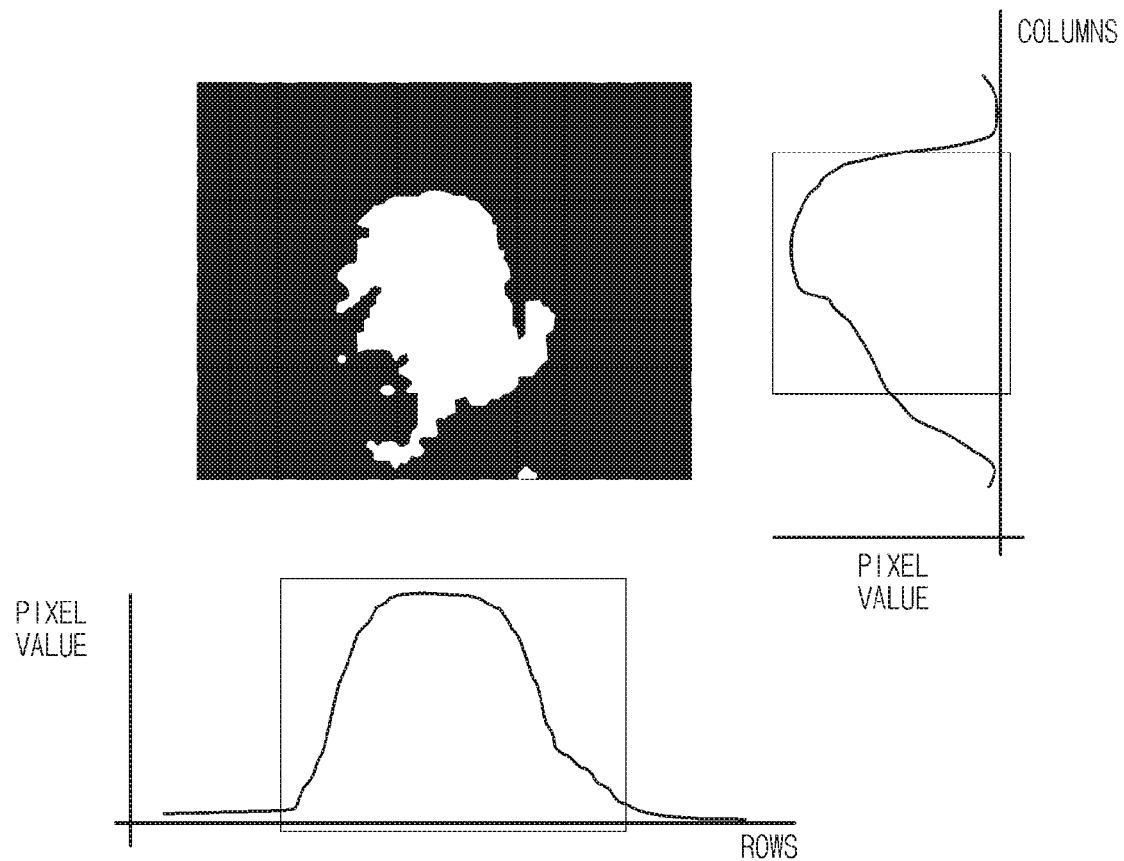

The image processor 120 may be configured to remove the noise within the binarization image using a designated mask (S123). As illustrated in FIG. 4B, the image processor 120 may be configured to remove the noise by the vehicle window from the binarization image using the designated mask. Thereafter, the image processor 120 may be configured to transmit the binarization image of which the image processing is performed to the controller 150. The controller 150 may then be configured to calculate the column accumulation graph in which all columns for each of rows are added, and the row accumulation graph in which values of all rows for each of columns are added, and detect the face position using the calculated column accumulation graph and row accumulation graph (S125) (see FIG. 4C).

Figure 5:
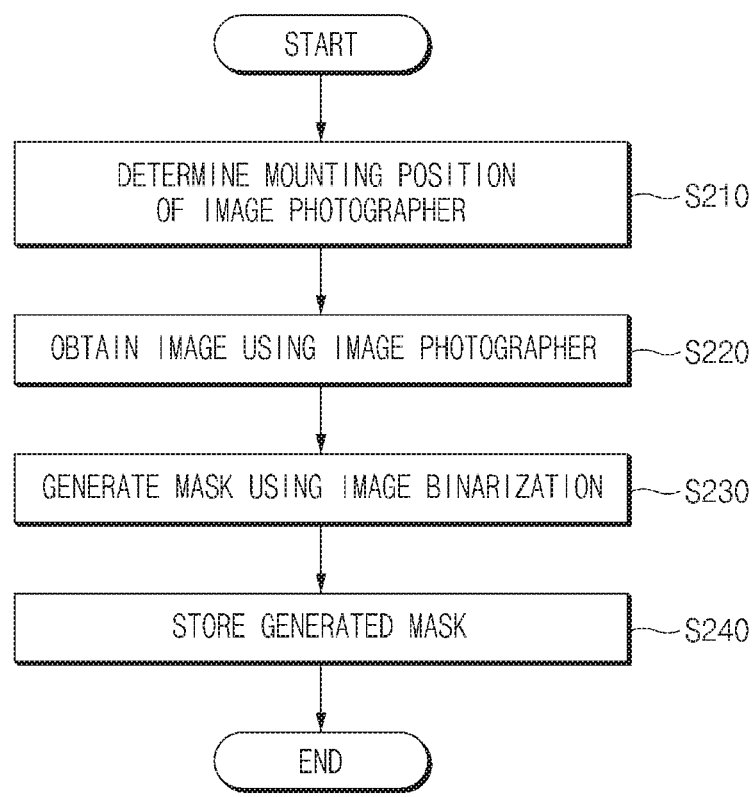
FIG. 5 is a flowchart illustrating a process of generating a mask according to an exemplary embodiment of the present disclosure.

FIG. 5 is a flowchart illustrating a process of generating a mask according to an exemplary embodiment of the present disclosure. As illustrated in FIG. 5, when a mounting position of the imaging device 110 and a type of vehicle are determined, the controller 150 may be configured to capture an image of the inside of the vehicle using the imaging device 110 (S210, S220). In particular, the imaging device 110 may be configured to obtain the image when the passenger is not on the corresponding seat in a bright indoor or at midday (e.g., bright lighting conditions). The image processor 120 may be configured to perform binarization for the image obtained by the imaging device 110 to generate the mask (S230). The image processor 120 may then be configured to store the generated mask in the memory 130 (S240).

Figure 6:
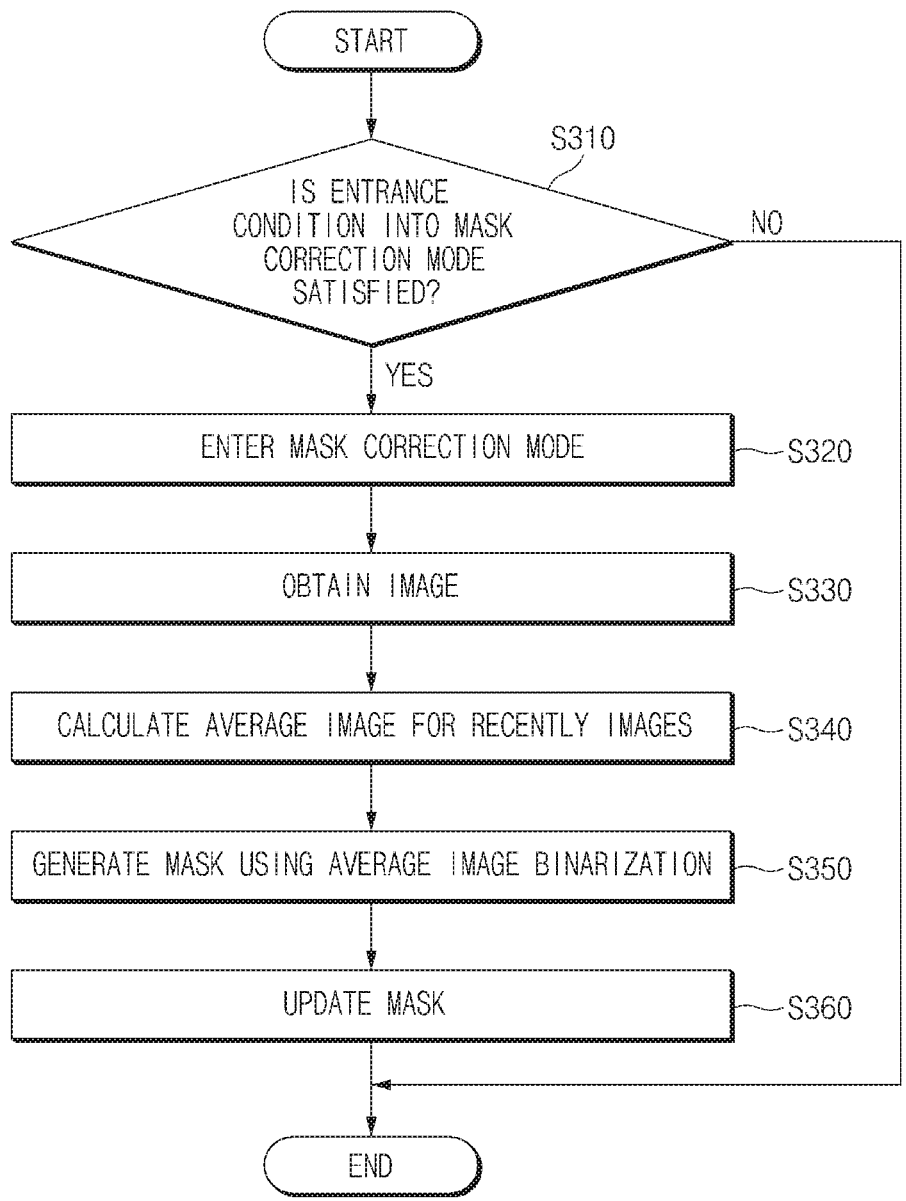
FIG. 6 is a flowchart illustrating a process of correcting a mask according to an exemplary embodiment of the present disclosure.

FIG. 6 is a flowchart illustrating a process of collecting a mask according to an exemplary embodiment of the present disclosure. When the position and the angle of the imaging device 110 are adjusted, the controller 150 may be configured to determine whether an entrance condition into a mask correction mode is satisfied (S310). For example, when the mounting position and the angle of the imaging device 110 are adjusted, the controller 150 may be configured to detect whether the passenger is located on the corresponding seat and determine whether the entrance condition into the mask correction mode is satisfied.

When the entrance condition into the mask correction mode is satisfied, the controller 150 may be configured to enter the mask correction mode (S320). Further, the controller 150 may be configured to obtain the image using the imaging device 110 (S330). For example, the controller 150 may be configured to obtain or capture the image using the imaging device 110 whenever the driver turns off and exits the vehicle or in response to determining, using the weight sensor, that the seat of the passenger is vacated. The controller 150 may be configured to store the obtained image in the memory 130.

The controller 150 may further be configured to operate the image processor 120 to calculate an average image of a predetermined number of images which are stored recently in the memory 130 (S340). The image processor 120 may be configured to calculate an average value for each of corresponding pixels between the respective images. The image processor 120 may then be configured to perform a binarization process for the calculated average image to generate the mask (S350). Additionally, the image processor 120 may be configured to update a previous mask stored in the memory 130 with the generated mask (S360).

Figure 7:
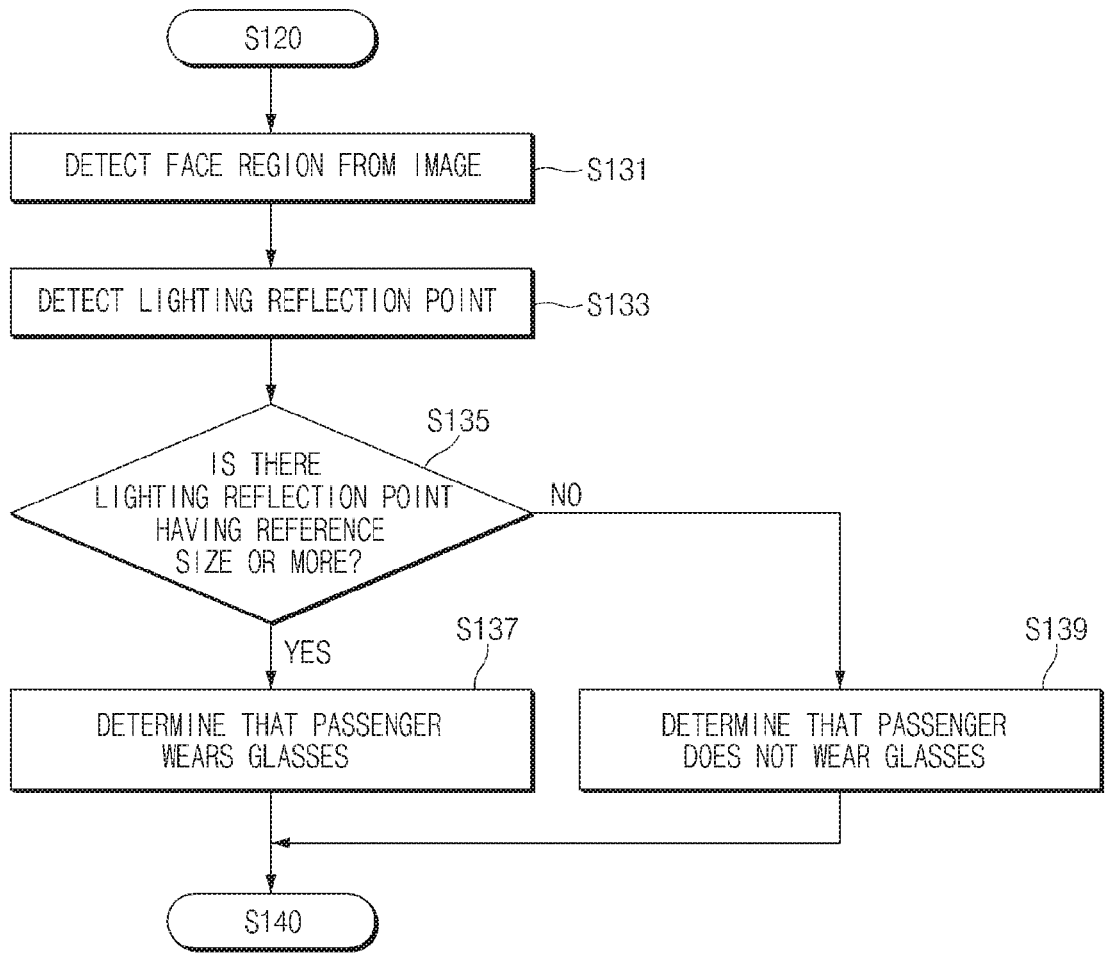
FIG. 7 is a flowchart illustrating a process of confirming whether a passenger wears glasses illustrated in FIG. 2 according to an exemplary embodiment of the present disclosure.

FIG. 7 is a flowchart illustrating a process of confirming whether a passenger wears glasses illustrated in FIG. 2. As illustrated in FIG. 7, the controller 150 may be configured o operate the image processor 120 to detect the face region (face image) from the image obtained by the imaging device 110 (S131). In particular, the image processor 120 may be configured to extract the eye region (eye image) from the detected face region and detect the lighting reflection point from the eye image.

The image processor 120 may be configured to detect the lighting reflection point from the detected face region (S133). Since the lighting reflection point is detected using a known lighting reflection point detection scheme in the present exemplary embodiment, a detailed description thereof will be omitted. Furthermore, the controller 150 may be configured to detect whether there is a lighting reflection point having a set reference size or greater among one or more lighting reflection points detected by the image processor 120 (S135). When a lighting reflection point is detecting having the reference size or greater, the controller 150 may be configured to determine that the passenger wears the glasses (S137). Meanwhile, when no lighting reflection point having the reference size or greater is detected, the controller 150 may be configured to determine that the passenger does not wear the glasses (S139).

Figure 8:
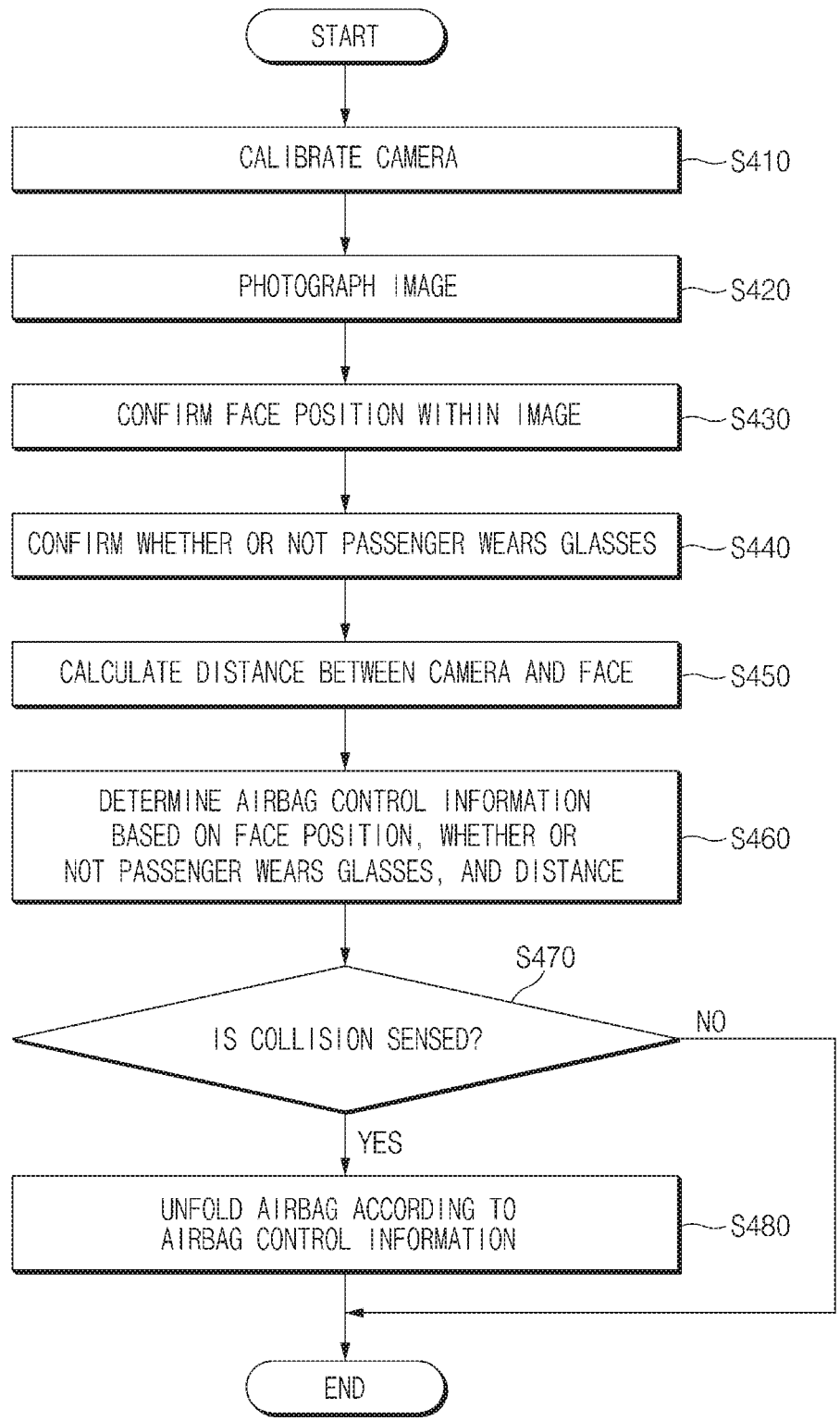
FIG. 8 is a flowchart illustrating a method for controlling an airbag according to another exemplary embodiment of the present disclosure.

FIG. 8 is a flowchart illustrating a method for controlling an airbag according to another exemplary embodiment of the present disclosure. The present exemplary embodiment describes an example in which the imaging device 110 includes two or more cameras. The controller 150 may be configured to calibrate two or more cameras 111 included in the imaging device 110 (S410). After positions of the two or more cameras 111 are determined, the controller 150 may be configured to execute the camera calibrations. After the camera calibration, the controller 150 may be configured to operate the imaging device 110 to photograph the image (S420). In particular, the imaging device 110 may be configured to capture or obtain two or more images using the two or more cameras 111.

The controller 150 may then be configured to detect the face position from the image obtained by the imaging device 110 (S430). The image processor 120 may be configured to convert each of the two or more images obtained from the imaging device 110 into the binarization image under the operation of the controller 150, and remove the noise within the image using the designated mask. In addition, the controller 150 may be configured to calculate a row accumulation graph and a column accumulation graph for each of the binarization images from which the noise is removed output from the image processor 120, and detect the face position of the passenger using the calculated row accumulation graph and column accumulation graph.

Additionally, the controller 150 may be configured to detect whether the passenger wears the glasses using the obtained image (S440). Particularly, the controller 150 may be configured to detect the lighting reflection points from the image of which the image processing is performed by the image processor 120, and detect whether there is a lighting reflection point having a set reference size or greater among the detected lighting reflection points. The controller 150 may be configured to determine whether the passenger wears the glasses based on whether the lighting reflection point having the set reference size or greater is detected.

The controller 150 may be configured to calculate a distance (face distance) between the camera 111 and the face of the passenger using the camera information of the imaging device 110 (S450). The controller 150 may be configured to determine the airbag control information based on the face position, whether the passenger wears the glasses, and the face distance (S460). Particularly, the airbag control information may include the unfolding angle, the unfolding pressure, and the unfolding speed of the airbag. Thereafter, the controller 150 may be configured to detect whether the collision of the vehicle is sensed using the collision sensor 140 (S470). For example, the controller 150 may be configured to predict the dangerous situation (e.g., a collision position, a collision time, and the like) of the vehicle in cooperation with the collision avoidance system (CAS). When the collision of the vehicle is sensed, the controller 150 may be configured to operate the airbag driver 160 based on the airbag control information to unfold the airbag (S480). The airbag driver 160 may be configured to operate or deploy the airbag at the determined unfolding angle, the determined unfolding pressure, and the determined unfolding speed.

According to the present disclosure, a camera having low resolution may be applied, and when the face of the passenger is inclined or angled to one side, a side airbag is unfolded, thereby making it possible to effectively protect the passenger. Further, according to the present disclosure, when the infrared LED and the infrared camera are used, the face distance and direction of the passenger, and whether the passenger wears the glasses may be confirmed based on the number of cameras. In addition, according to the present disclosure, since calculation is simplified, the present disclosure may also be implemented using a vehicle controller. As described above, according to the exemplary embodiments of the present disclosure, since the face information of the passenger is extracted using the camera, and the unfolding angle (direction), the unfolding speed, and the unfolding pressure of the airbag may be adjusted by considering the extracted face information, the passenger may be effectively protected.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling airbags, comprising:
    an imaging device including one or more cameras and one or more lights;
    an image processor configured to perform an image processing for an image obtained by the imaging device;
    a collision sensor configured to sense a collision of a vehicle;
    an airbag driver configured to operate the airbags; and
    a controller configured to extract face information of a passenger from the image of which the image processing is performed by the image processor, determine airbag control information based on the extracted face information, and operate the airbag driver based on the determined airbag control information when the collision of the vehicle is predicted,
    wherein the airbag driver selectively unfolds the airbags under the control of the controller, and
    wherein the face information includes whether the passenger wears the glasses, and
    wherein the airbag control information includes an unfolding angle, an unfolding pressure, and an unfolding speed of the airbags.

2. The apparatus according to claim 1, wherein the imaging device is implemented by a driver state monitoring (DSM) apparatus.

3. The apparatus according to claim 1, wherein the controller is configured to perform one or more camera calibrations when the imaging device is mounted within the vehicle and when the imaging device includes two or more cameras.

4. The apparatus according to claim 1, wherein the face information includes a face position, and a distance between the camera and a face.

5. The apparatus according to claim 1, wherein the image processor is configured to convert the obtained image into a binarization image and remove noise using a mask.

6. The apparatus according to claim 5, wherein the image processor is configured to perform a binarization processing for the image obtained by the imaging device when the passenger is not detected on a seat to generate the mask, and store the generated mask in a memory.

7. The apparatus according to claim 6, wherein when a mounting position and angle of the imaging device are adjusted, the image processor is configured to capture an image of inside the vehicle when no passenger is detected and perform the binarization processing for the photographed image to generate the mask, and update a previous mask stored in the memory.

8. The apparatus according to claim 1, wherein the controller is configured to determine whether the passenger wears glasses based on whether a lighting reflection point having a reference size or greater is detected within the obtained image.

9. A method for controlling airbags, comprising:
   obtaining, by an imaging device, an image;
   extracting, by a controller, face information of a passenger from the obtained image;
   determining, by the controller, airbag control information based on the face information;
   sensing, by the collision sensor, a collision of a vehicle after the determining of the airbag control information; and
   unfolding, by the controller, the airbags based on the airbag control information when the collision of the vehicle is sensed,
   wherein the controller selectively unfolds the airbags,
   wherein the face information includes whether the passenger wears glasses, and
   wherein the airbag control information includes an unfolding angle, an unfolding pressure, and an unfolding speed of the airbags.

10. The method according to claim 9, further comprising:
    performing, by the controller, a camera calibration before the obtaining of the image, when the imaging device includes two or more cameras.

11. The method according to claim 9, wherein the extracting of the face information includes:
    confirming, by the controller, a face position within the obtained image; and
    confirming, by the controller, whether the passenger wears glasses from the obtained image.

12. The method according to claim 11, wherein the confirming of the face position includes:
    converting, by an image processor, the obtained image into a binarization image;
    removing, by the image processor, noise within the binarization image using a designated mask; and
    detecting, by the controller, the face position by calculating a column accumulation graph and a row accumulation graph for the binarization image from which the noise is removed.

13. The method according to claim 11, further comprising:
    calculating, by the controller, a distance between a camera and a face of the passenger after detecting the face position.

14. The method according to claim 11, wherein whether the passenger wears the glasses is detected using a lighting reflection point detected within the obtained image.

* * * * *